ated parts of the dasher the most complete and thorough agitation of the cream is effected.

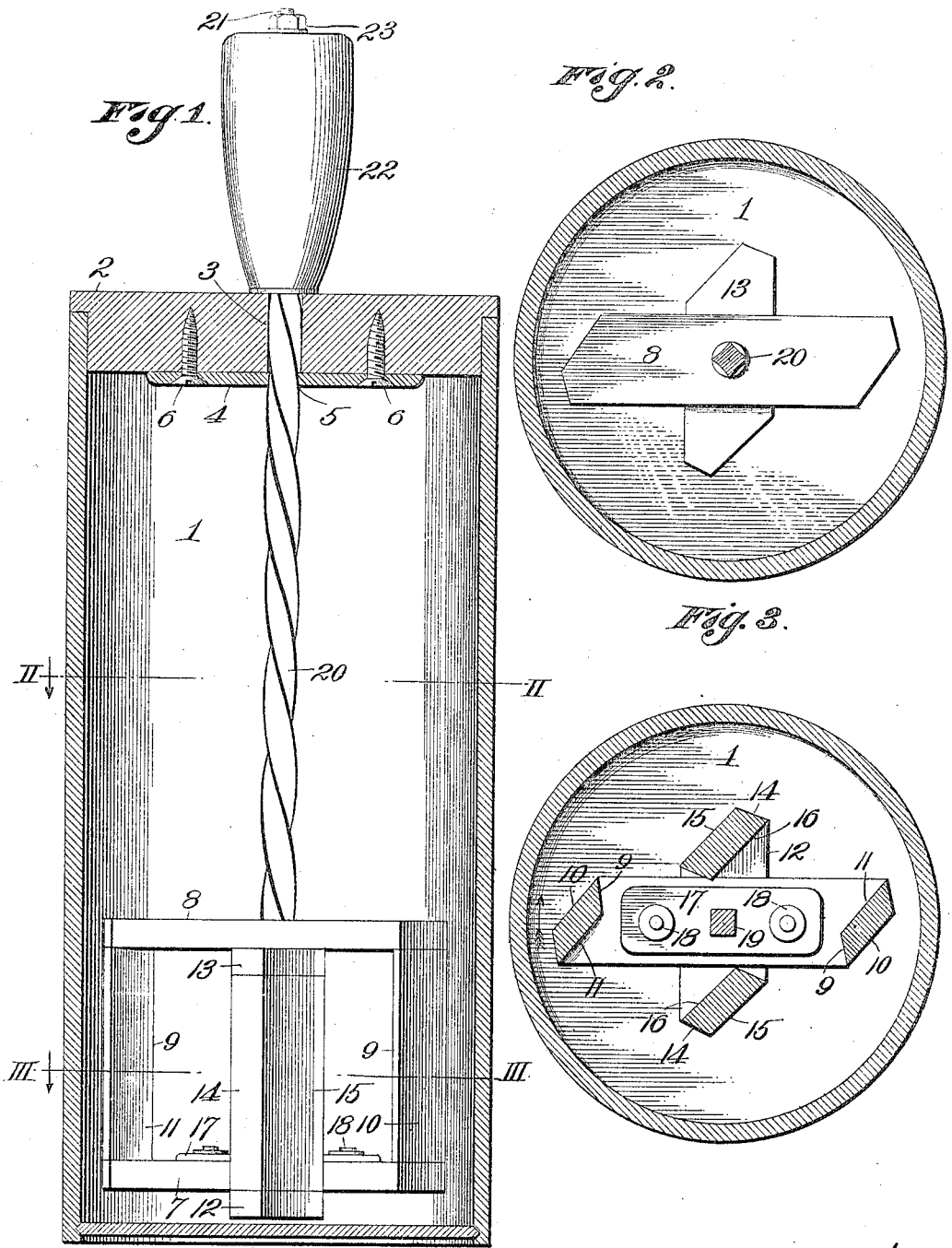

UNITED STATES PATENT OFFICE.

WILLIAM L. POOL, OF AZTEC, TERRITORY OF NEW MEXICO.

CHURN.

No. 812,592. Specification of Letters Patent. Patented Feb. 13, 1906.

Application filed June 20, 1904. Serial No. 213,211.

*To all whom it may concern:*

Be it known that I, WILLIAM L. POOL, a citizen of the United States, residing at Aztec, in the county of San Juan and Territory of New Mexico, have invented certain new and useful Improvements in Churns, of which the following is a specification.

This invention relates to churns; and my object is to produce a churn by which butter can be produced in a minimum of time and of that class which can be operated easily and in which the dasher has simultaneously revolving and reciprocating movement in order that it may act effectively on the entire body of the cream; and my object is to produce a dasher which tends to revolve the cream in opposite directions at the same time, so as to effect the most thorough and complete agitation possible.

To these ends the invention consists in certain novel and peculiar features of construction and combinations of parts, as hereinafter described and claimed; and in order that it may be fully understood reference is to be had to the accompanying drawings, in which—

Figure 1 is a central vertical section of a churn constructed in accordance with my invention. Fig. 2 is a horizontal section taken on the line II II of Fig. 1. Fig. 3 is a section taken on the line III III of Fig. 1.

In the said drawings, 1 designates the body of the churn, the same being preferably of cylindrical form. 2 is the cover, adapted to fit down into the body and of the type shown or of any other suitable or perferred construction. Said cover is provided with a central vertical passage 3 and on its lower side, by preference, with a metallic plate 4, having a square central hole 5 registering with the somewhat larger passage 3. Plate 4 is preferably secured to the cover by screws 6.

The dasher is constructed as follows: 7 and 8 designate horizontal bottom and top bars somewhat shorter than the interior diameter of the churn-body and connected by vertical dash-arms 9, which are disposed at about an angle of forty-five degrees, to bars 7 and 8, the arrangement being such that rotation of the dasher in the direction indicated by the arrow, Fig. 3, results in the outer faces 10 of said arms dashing the cream outwardly. Rotation in the opposite direction results in the inner faces 11 of said arms tending to dash the cream inwardly.

12 and 13 designate horizontal bars shorter than bars 7 and 8 and respectively secured at right angles to the latter. The outer ends of bars 12 and 13 are connected by vertical dash-arms 14 so disposed that their outer sides 15 will tend to force the cream outwardly when rotating in the opposite direction to that indicated by the arrow, the inner sides 16 of said arms tending to force the cream inwardly when rotated in the opposite direction. The proportion of the parts of the dasher is such that arms 9 and 14 describe concentric circles when in operation.

17 is a metallic plate secured, as at 18 or otherwise, to the upper side of bar 7 in order to provide a more reliable connection therewith for the lower portion 19 of the stem of the dasher, the upper portion of said stem being twisted and identified by number 20.

In practice the twist is preferably about one and one-half times to each six inches length of the stem; but of course I do not confine myself to these proportions. The stem 20 extends snugly through the hole 5 of plate 4 and loosely through the hole 3 of the cover and terminates in a diametrically-reduced cylindrical stem 21, upon which is loosely mounted a handle 22, a suitable nut 23 being employed to retain the handle in position.

In operation the handle 22 is grasped and reciprocated vertically, which action imparts similar movement to the dasher, the latter at the same time being revolved rapidly because of the relation between the plate 4 and the spiral or twisted stem portion, the rotation being in one direction as the dasher rises and in the opposite direction as it descends, as will be readily understood. As it moves vertically and rotates in the direction indicated by the arrow the outer portion of the cream is forced outwardly against the walls of the churn-body by the outwardly-disposed surfaces 10 of dash-arms 9, and the inner portion of the cream is forced inwardly by the inner surfaces 16 of the dash-arms 14. As the vertical movement is reversed the rotation of the dasher is also reversed, so that the inner surfaces 11 of arms 9 shall force the outer portion of the cream inwardly and the outer surfaces of arm 14 shall force the inner portion of the cream outward, and therefore in opposition to the outer portion. In both the up and down movements it will be obvious that the cream is most violently agitated and that by reason of the synchronous vertical and rotative movements of the churn-dasher the casein of the cream will be broken and butter produced in the minimum of time. In fact, I have produced butter in two minutes and forty-five seconds.

From the above description it will be apparent that I have produced a churn which embodies the features of advantage enumerated as desirable in the statement of invention, and while I have illustrated and described the preferred embodiment it will be apparent that it is susceptible of modifications in minor particulars without departing from the principle and scope or sacrificing any of the advantages.

Having thus described the invention, what I claim as new, and desire to secure by Letters Patent, is—

A rotary churn-dasher including two sets of dasher-blades, the members of each set being in substantial parallelism at an angle to the path of rotation different from the angular disposition of the other set of blades, the space between each set of blades and the axis of rotation being unobstructed.

In testimony whereof I affix my signature in the presence of two witnesses.

WILLIAM L. POOL.

Witnesses:
W. W. BAY,
S. P. CAMERON.